(12) United States Patent
Lee

(10) Patent No.: US 9,640,787 B2
(45) Date of Patent: *May 2, 2017

(54) ELECTRIFIED BATTERY TRAY ASSEMBLIES

(71) Applicant: Richard C. Lee, Upper Marlboro, MD (US)

(72) Inventor: Richard C. Lee, Upper Marlboro, MD (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/300,555

(22) Filed: Jun. 10, 2014

(65) Prior Publication Data

US 2014/0287289 A1 Sep. 25, 2014

Related U.S. Application Data

(63) Continuation-in-part of application No. 13/609,229, filed on Sep. 10, 2012, now Pat. No. 9,083,031, and a continuation-in-part of application No. 13/842,363, filed on Mar. 15, 2013, now Pat. No. 9,153,808.

(60) Provisional application No. 61/833,317, filed on Jun. 10, 2013.

(51) Int. Cl.
*H01M 2/10* (2006.01)

(52) U.S. Cl.
CPC ....... *H01M 2/1083* (2013.01); *H01M 2/1072* (2013.01)

(58) Field of Classification Search
CPC .................. H01M 2/1072; H01M 2/1083
USPC ............................................. 429/100
See application file for complete search history.

(56) References Cited

U.S. PATENT DOCUMENTS

| | | | | |
|---|---|---|---|---|
| 3,989,544 A * | 11/1976 | Santo | ............... | H01M 2/20 429/121 |
| 4,885,524 A * | 12/1989 | Wilburn | ............... | H01M 2/305 307/10.1 |
| 5,764,025 A * | 6/1998 | Lehmann | ............... | B60R 16/04 320/105 |
| 6,035,561 A * | 3/2000 | Paytas | ............... | E01H 5/045 180/68.5 |
| 6,190,795 B1 * | 2/2001 | Daley | ............... | B60K 1/04 429/100 |
| 6,521,371 B1 * | 2/2003 | Lavanture | ........... | H01M 2/1072 180/68.5 |
| 6,564,893 B2 * | 5/2003 | Lipman | ............... | H01M 2/1083 180/68.5 |
| 2011/0262801 A1 * | 10/2011 | Schwab | ............... | B60K 1/04 429/163 |

* cited by examiner

*Primary Examiner* — Sean P Cullen

(57) ABSTRACT

An electrified battery tray assembly comprising a pair of battery positive and negative terminal engaging elements wiredly connected to at least one plug receiving connector on the tray for accessing battery power via the at least one connector.

14 Claims, 12 Drawing Sheets

ELECTRIFIED BATTERY TRAY ASSEMBLIES

This invention is a Continuation in Part of U.S. Ser. No. 13/609,229 Date of Filing Sep. 10, 2012, currently U.S. Pat. No. 9,083,031 Dated Jul. 14, 2015, and U.S. Ser. No. 13/842,363 Date of Filing Mar. 15, 2013, currently U.S. Pat. No. 9,153,808 Dated Oct. 6, 2015; and claims priority to U.S. Provisional 61/833,317 filed Jun. 10, 2013, all of which are herein incorporated by reference.

BACKGROUND OF THE INVENTION

1. Field of the Invention

The present invention relates to electrified battery tray and hold down assemblies for mounting electrical storage batteries in automobiles, marine, and other engine constructs requiring electrical storage batteries.

2. Description of the Related Art

Lead acid batteries are used in a wide variety of vehicles powered by combustion engine as well as in electric vehicles. In order to assure safe and reliable operation, the battery is normally positioned in some form of tray which is secured to the vehicle, while a hold down device such as a tie or clamp is used to secure the battery to the tray. When battery replacement is required, the battery hold down device that secures a battery on the vehicle battery tray is loosened and the battery is removed and replaced.

Quite frequently; the hold down bolts used to fasten the battery tray to the vehicle frame are themselves either corroded, or the metal of the battery tray adjacent thereto becomes corroded. In either event, the deterioration and weakening of the metal involved allows the battery tray to shift and move relative to the vehicle frame. This contributes significantly to jarring and jostling of a battery fastened therein as the vehicle moves. Such movement increases the probability and degree to which solid matter in the acid compartments of the battery cells forms bridges across adjacent plates in the cells.

Also, it is frequently the case that the nuts and bolts and rings used to secure the electric cables to the positive and negative posts of the batteries also become corroded over time making it necessary to replace them every now and then.

As a battery is used, a certain amount of metallic flaking occurs within the cells of a lead storage battery as the acid attacks impurities in the lead and lead oxide plates. Because of the ionic nature of the electrolytic solution in the lead storage cells, the accumulation of solid material that settles to the bottom of the storage cells tends to arrange itself in continuous paths of electrical communication between adjacent plates in the cells. Once such paths or bridges are created they form short circuits and produce "dead" battery cells. Once such a defect occurs, the battery must again be replaced. While this phenomena tends to occur at a relatively slow rate through normal battery usage, this deteriorative process is accelerated markedly by jostling and rocking of the battery within the vehicle. While virtually all automotive vehicles include at least some firm of shock absorbing and cushioning equipment to insulate the vehicle frame from road shocks, a poor attachment of the battery tray to the vehicle frame will magnify the extent of sharp movement of the battery relative to the frame.

SUMMARY OF THE INVENTION

One object of the invention is to provide an electrified battery tray assembly comprising a body having a base, a pair of opposing end walls defining an interior, a pair of battery positive and negative terminal engaging elements wiredly connected to at least one plug receiving connector on the tray for accessing battery power via the at least one connector. The body is dimensioned to receive a first battery or a plurality of batteries.

In a preferred embodiment, the electrified battery tray assembly comprises a base, a pair of end walls, and a pair of side walls extending from the base defining an interior, a pair of battery positive and negative terminal engaging elements wiredly connected to at least one plug receiving connector on the tray for accessing battery power via the at least one connector.

Another object of the invention is to provide an electrified battery hood assembly comprising a base, a pair of end walls, and an extended side wall extending from the base wherein the base and the side walls define a battery receiving interior and the extended side wall extending from the base comprises a pair of battery positive and negative terminal engaging elements wiredly connected to at least one plug receiving connector on the hood for accessing battery power via the at least one connector.

Another object of the invention is to provide an electrified battery hood assembly comprising a top tray and a bottom tray, each tray comprising a base, a pair of end walls, and an extended side wall connecting the base of the top and bottom tray, wherein the base and end walls of the bottom tray define a battery receiving interior and the base and end walls of the top tray define a battery cradling interior and the extended side wall comprising a pair of battery positive and negative terminal engaging elements wiredly connected to at least one plug receiving connector on the hood for accessing battery power via the at least one connector.

The body is preferably formed of a polymeric material in a unitary construction and meets the requirements of Title 33 C.F.R. Section 183.420.

Another object of the invention is to provide an electrified battery tray assembly and hold down assembly wherein the battery tray assembly comprises a base, a pair of end walls, and a pair of side walls extending from the base defining an interior, a pair of battery positive and negative terminal engaging elements wiredly connected to at least one plug receiving connector on the tray for accessing battery power via the at least one connector.

Another object of the invention is to provide an electrified battery hood and hold down wherein the hood assembly comprises a base, a pair of end walls, and an extended side wall extending from the base wherein the base and the side walls define a battery receiving interior and the extended side wall extending from the base comprises a pair of battery positive and negative terminal engaging elements wiredly connected to at least one plug receiving connector on the hood for accessing battery power via the at least one connector.

Another object of the invention is to provide an electrified battery hood and hold down assembly, the hood comprising a top tray and a bottom tray, each tray comprising a base, a pair of end walls, and an extended side wall connecting the base of the top and bottom tray, wherein the base and end walls of the bottom tray define a battery receiving interior and the base and end walls of the top tray define a battery cradling interior and the extended side wall comprising a pair of battery positive and negative terminal engaging elements wiredly connected to at least one plug receiving connector on the hood for accessing battery power via the at least one connector.

A further object of the invention is to provide a simple battery tray assembly and battery hold down assembly having fewer component parts than conventional battery tray and hold downs and which take less time to assemble and install on the vehicle than any prior battery tray and battery hold down assembly.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
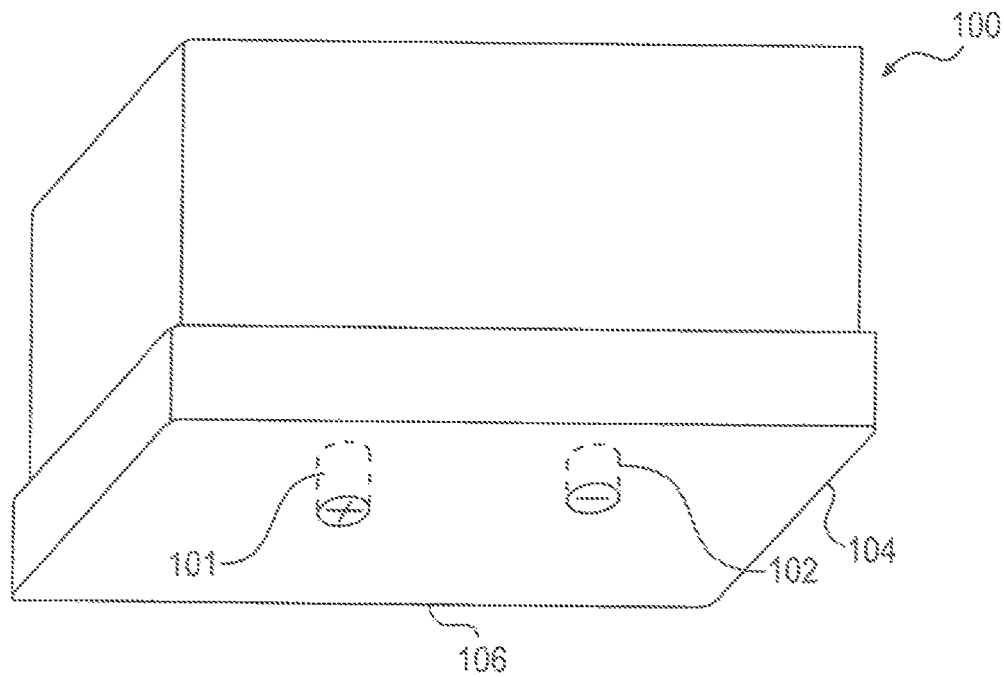
FIG. 1 illustrates a lead acid battery with bottom disposed terminals in the form of cylindrical cavities for engaging corresponding battery terminal engaging elements on the electrified battery tray.

Referring now to the drawings, and the illustrative embodiments depicted therein, an electrified battery tray 10 is of generally a rectangular shape and includes a base 20, a pair of opposing side walls 22 and a pair of opposing end walls 24. Side walls 22, and end walls 24 project substantially orthogonally from base 20 and collectively with base 20 define an interior 26. The intersection of side walls 22 and end walls 24 define corners 28 which may or may not be rounded.

The battery tray base is rectangularly shaped and is of a size adapted to receive lead storage batteries currently available commercially. The battery tray base is solid to protect the underside of the battery from beneath. In one embodiment, the battery tray base 20 includes shallow, recessed wells and/or ridges arranged latitudinally along the width of the base 20 of the battery tray 10.

Figure 2:
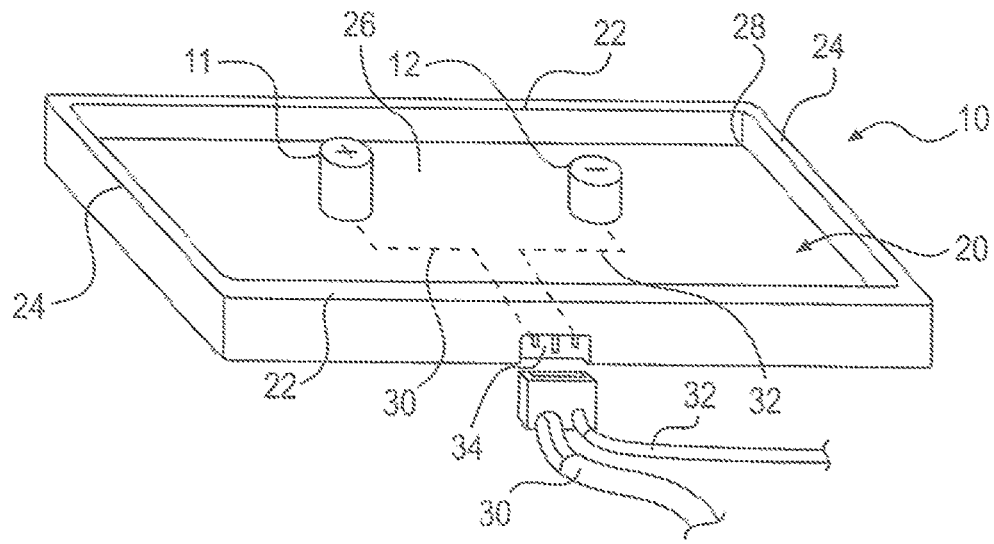
FIG. 2 illustrates a bottom mounted electrified battery tray comprising battery terminal engaging elements in the form of cylindrical protrusions for engaging corresponding cylindrical cavities of the battery terminal of FIG. 1.
Figure 3:
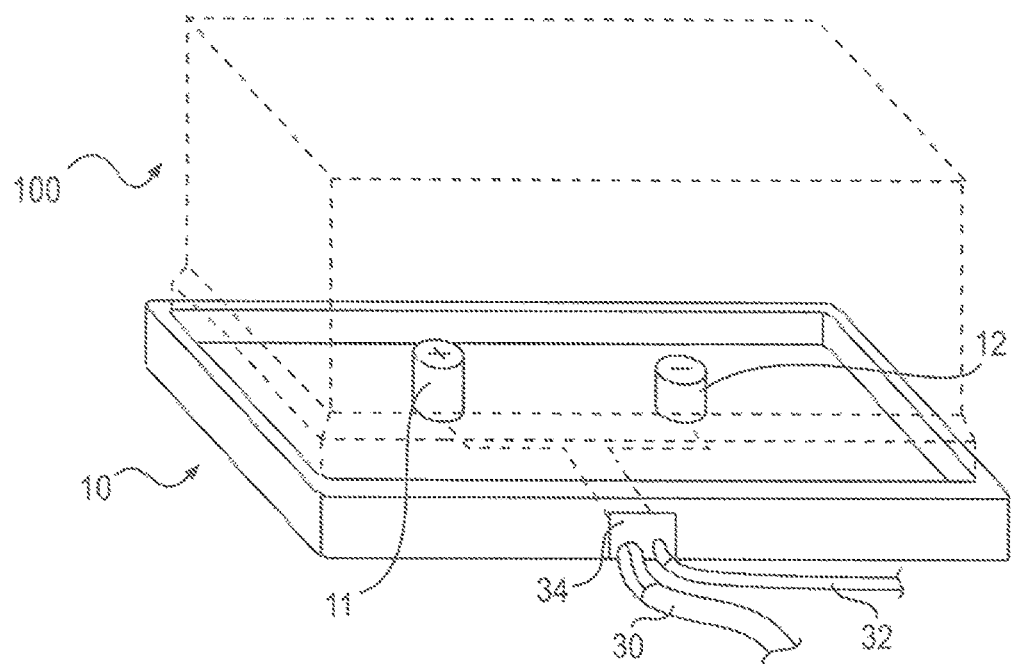
FIG. 3 is a schematic of the battery and battery tray assembly of FIGS. 1 and 2 when assembled.

Referring to FIG. 2, responsive to the deficiencies in the prior art, the present invention also provides an electrified battery tray 10 including a base 20 having an inner surface and an outer surface, end walls 24 having outer and inner surfaces adapted to overlay the base outer surface and to create substantially planar, vertical end wall inner surfaces thereby, and left and right side walls 22 having outer and inner surfaces adapted to longitudinally overlay the base outer surface and to create substantially planar, vertical left and right side wall inner surfaces thereby. In a preferred embodiment of the present invention the end and side walls' inner and outer surfaces are spaced a predetermined distance to form cavities therebetween. The cavities may be filled with a thermal insulation core material, preferably low density urethane foam.

Battery 100 is of a conventional type having positive 101 and negative terminals 102. Battery 100 is securely held within interior 26 of battery tray 10, with the distance between ends 104 of battery 100 being slightly less than the distance between the interior surfaces of end walls 24. Moreover, the distance between sides 106 is slightly less than the distance between the interior surfaces of side walls 22 such that ends 104 and sides 106 of battery 100 are proximate to end walls 24 and side walls 22, respectively of battery tray 10.

In one embodiment, the interior surface 26 of battery tray 10 includes a plurality of ribs (not shown) with the top surface of the ribs lying generally in a single plane, and together define a floor upon which the bottom of battery 100 is supported. The ribs, as they provide an elevated floor upon which battery 100 sits, permit any water within tray 10 to reside below battery 100. The ribs also provide structural integrity and increase the strength of battery tray 10. It will be recognized by those with ordinary skill in the art that various configurations of ribs may be employed without departing from the spirit and scope of the invention.

Provided in the interior 26 on the base 20 of the battery tray 10 are a pair of battery terminal engaging elements, namely a positive battery terminal engaging element 11 and a negative battery terminal engaging element 12 designed to engage the positive battery terminal 101 and the negative battery terminal 102 when the battery is seated on the interior 26 of the electrified battery tray 10.

As shown in FIGS. 1 and 2, the battery terminal engaging elements 11 and 12 may be configured in the form of cylindrical protrusions designed to engage corresponding cylindrical cavities (i.e. positive battery terminal 101) and (i.e. negative battery terminal 102) of the battery.

Figure 5:
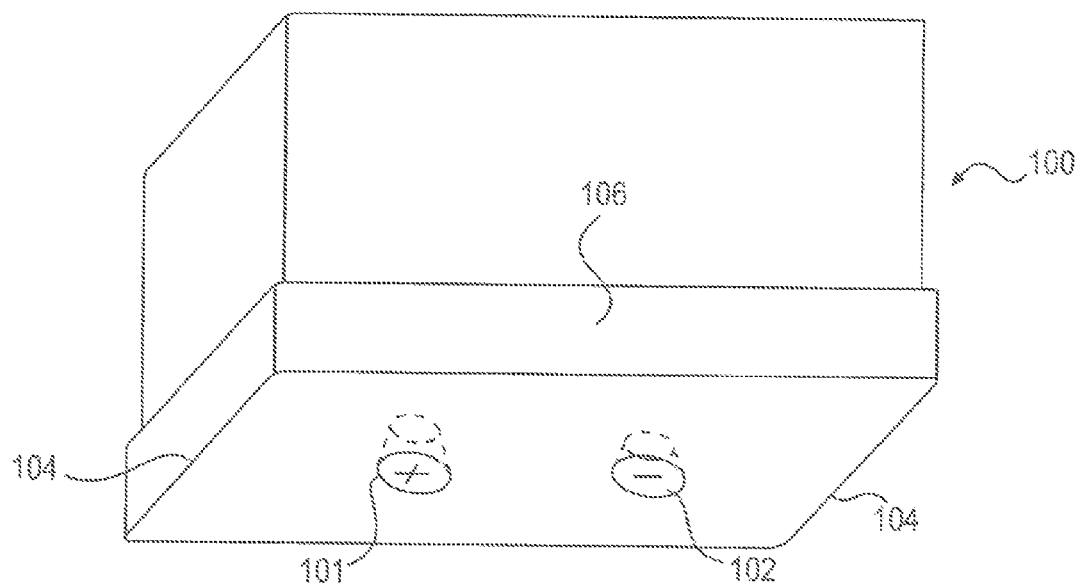
FIG. 5 illustrates a lead acid battery with bottom disposed terminals in the form of conicoid cavities for engaging corresponding battery terminal engaging elements on the electrified battery tray.
Figure 6:
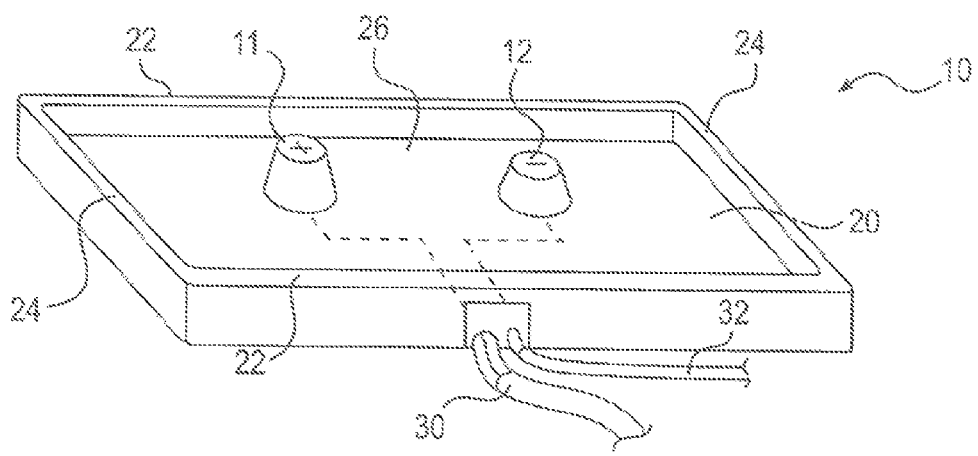
FIG. 6 illustrates a bottom mounted electrified battery tray comprising battery terminal engaging elements in the form of conicoid protrusions for engaging corresponding conicoid cavities of the battery terminal of FIG. 5.
Figure 7:
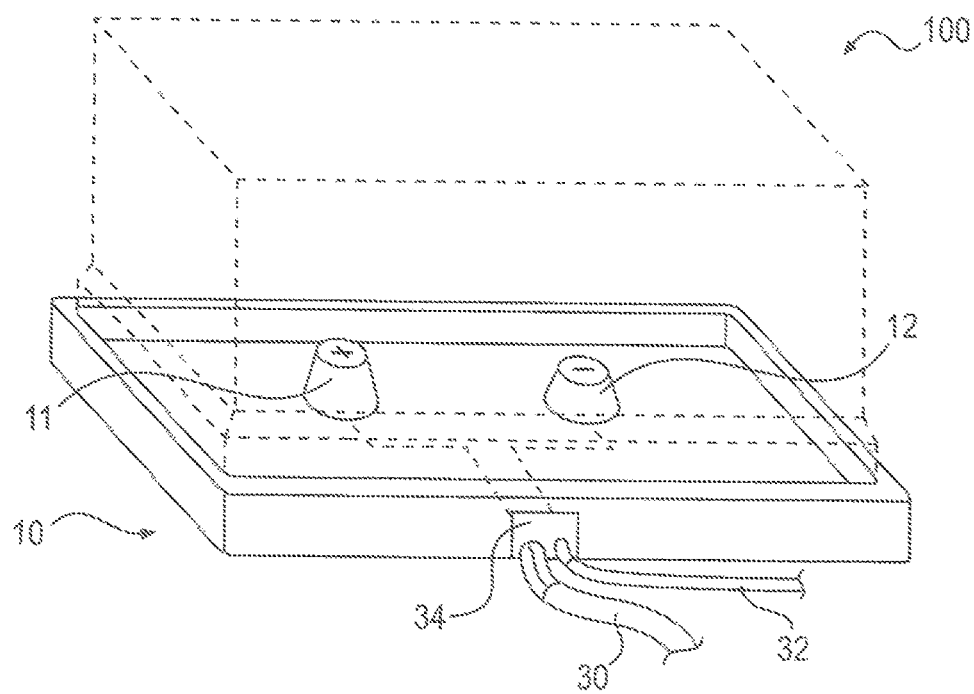
FIG. 7 is a schematic of the battery and battery tray assembly of FIGS. 5 and 6 when assembled.
Figure 8:
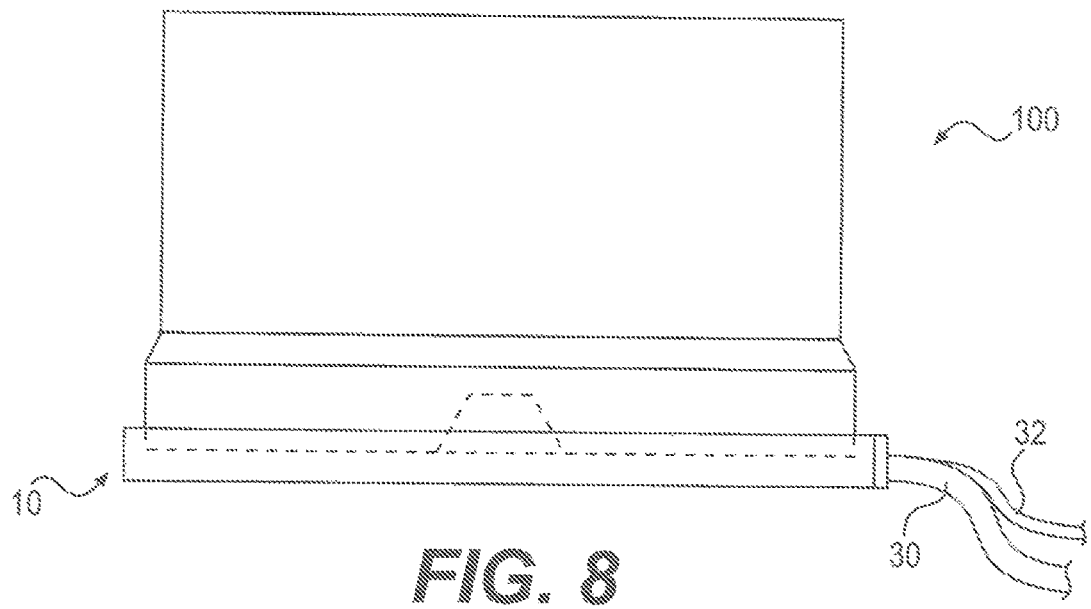
FIG. 8 illustrates a side view of the battery and battery tray assembly of FIG. 7.

In FIGS. 5 and 6, the battery terminal engaging elements 11 and 12 may be configured in the form of conicoid protrusions designed to engage corresponding conicoid cavities (i.e. positive battery terminal 101) and (i.e. negative battery terminal 102) of the battery as shown in FIGS. 7 and 8.

Figure 9:
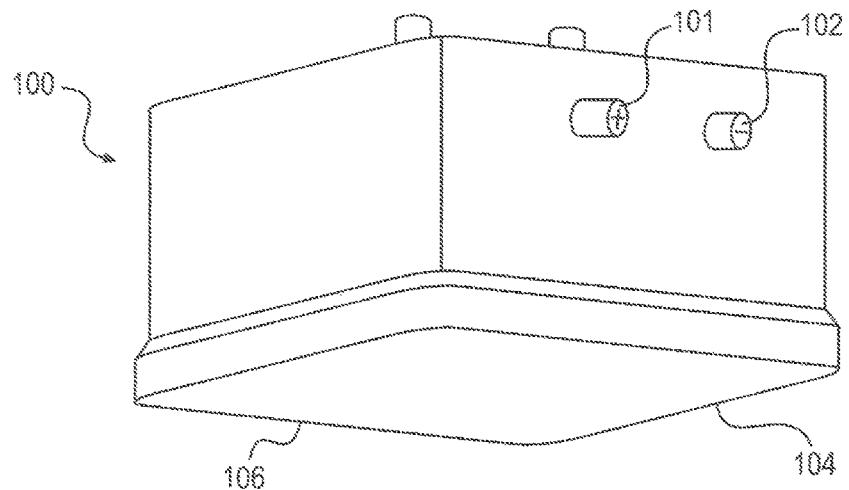
FIG. 9 illustrates a battery with side mounted terminals in the form of cylindrical protrusions.
Figure 10:
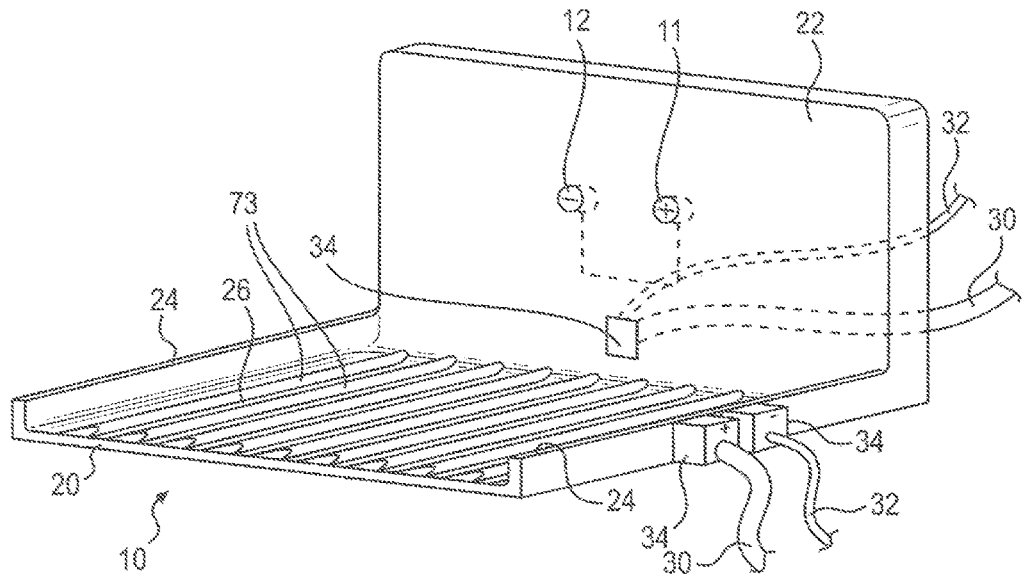
FIG. 10 illustrates one embodiment of a battery tray assembly comprising battery terminal engaging elements in the form of side mounted cylindrical cavities for engaging corresponding cylindrical protrusions of FIG. 9.
Figure 11:
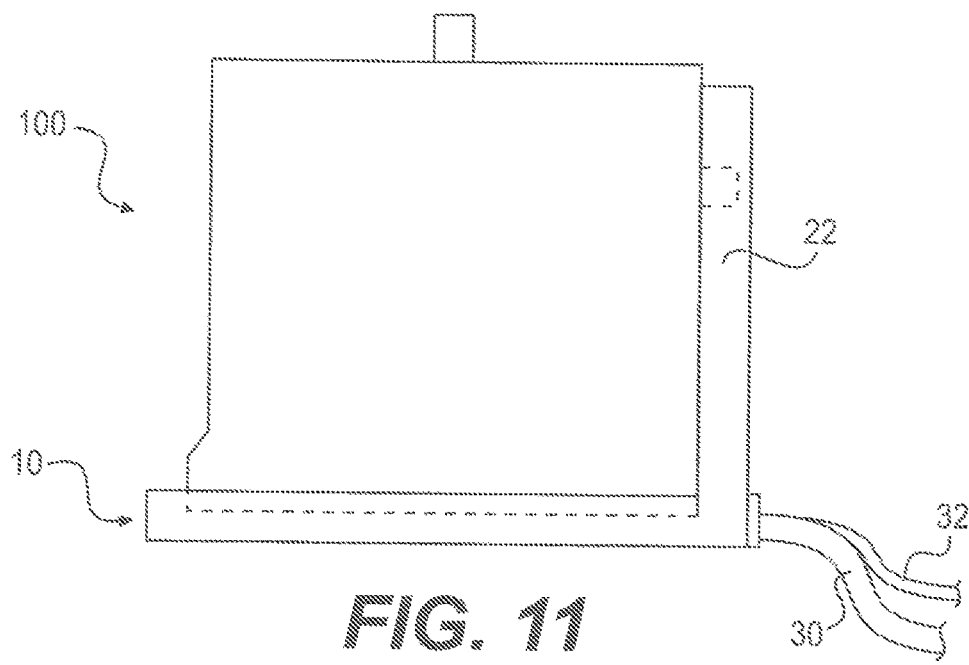
FIG. 11 is a side view of the battery and battery tray assembly of FIGS. 9 and 10.
Figure 12:
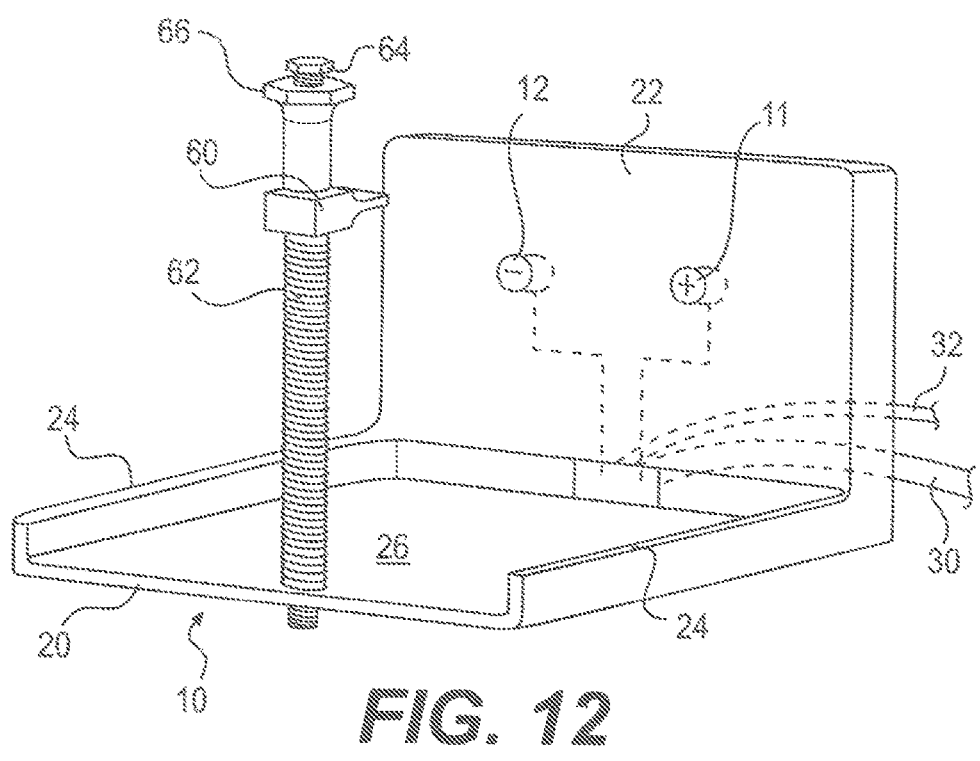
FIG. 12 illustrates one embodiment of battery hold down assembly configured to operate with the battery and battery tray assembly of FIG. 11.

In FIGS. 9 and 10, the battery terminal engaging elements 11 and 12 may be configured in the form of cylindrical cavities designed to engage corresponding cylindrical protrusions (i.e. positive battery terminal 101) and (i.e. negative battery terminal 102) of the battery.

Figure 21:
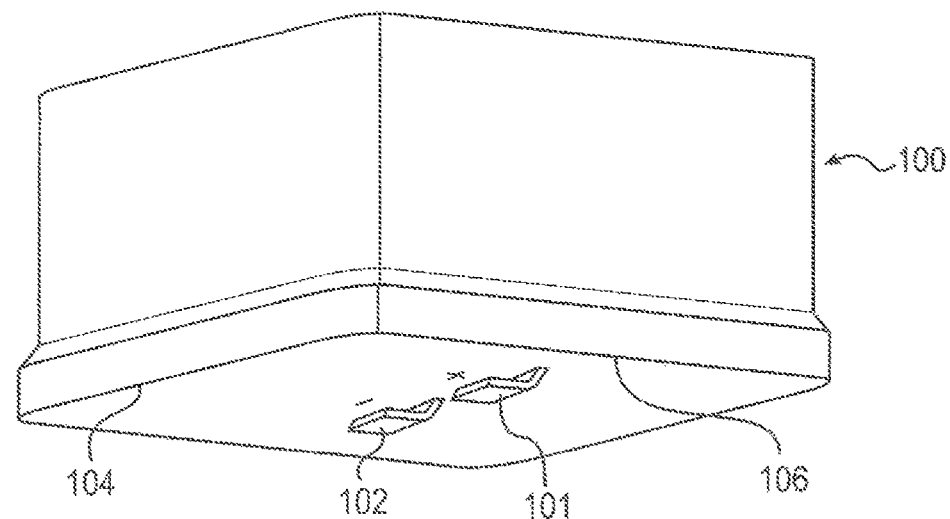
FIG. 21 illustrates a battery whose terminals are in the form of bottom mounted J-hooks.
Figure 22:
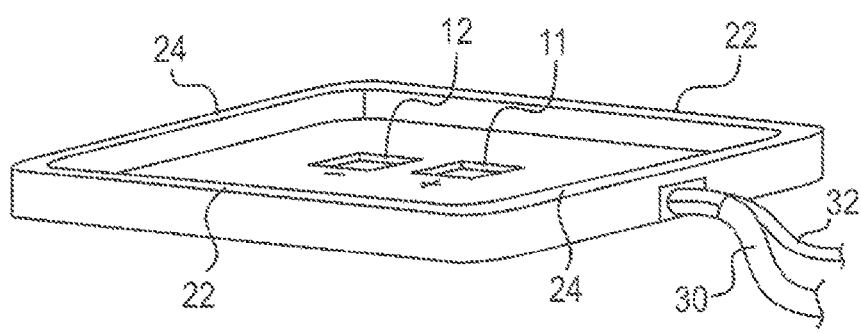
FIG. 22 is a bottom mounted battery tray whose terminal engaging elements are in the form of J-hook, stab lock, or bus interlocking receiving cavities designed to receive the corresponding J-hook, stab lock, or bus interlocking terminals of the battery of FIG. 21.
Figure 23:
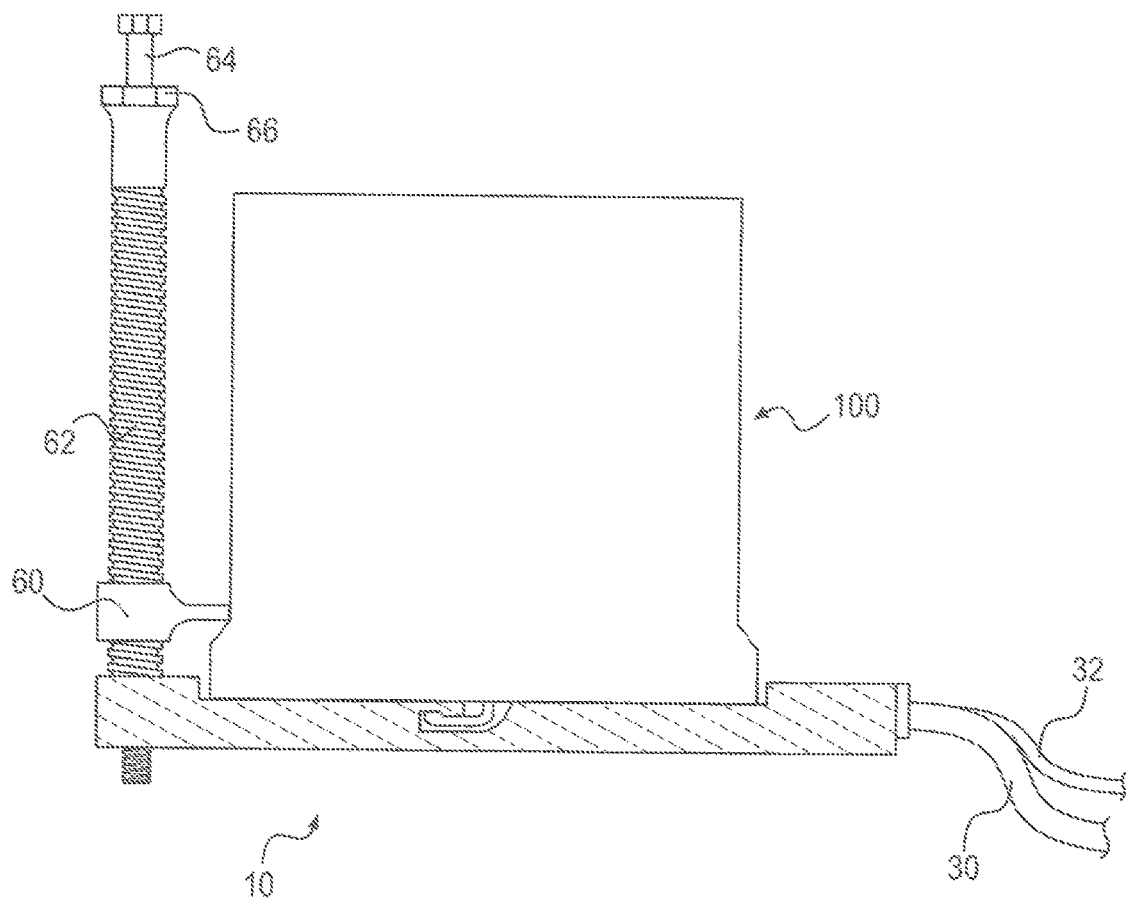
FIG. 23 illustrates an easy to use hold down assembly in conjunction with the battery and battery tray of FIGS. 21 and 22.

In FIGS. 21 and 22, the battery terminal engaging elements 11 and 12 may be configured in the form of J-hook, stab lock, or interlocking bus receiving cavities designed to engage corresponding J-hook, stab lock, or interlocking bus terminals 101 and 102 of the battery.

It is understood by those skilled in the art that this invention is not limited in any way by the design of the battery terminal engaging elements 11 and 12 and the corresponding battery terminals 101 and 102.

The base 20 of the electrified battery tray 10 is provided with a means for bearing the positive 30 and negative 32 battery cables from the at least one connector 34 to the terminal engaging elements 11 and 12. In one embodiment, a covered recessed well leading from the connector to the battery terminal engaging elements on the battery tray is provided for connecting the electrical cables 30 and 32 between the battery terminal engaging elements 11 and 12 and the connector 34.

In one embodiment, the battery tray is provided with two separate wire bearing conduits, well, recess, or channel, one for the positive 30 and the other for the negative cable 32 running up respectively to the positive and negative battery terminal engaging elements 11 and 12.

In one embodiment, the electrified battery tray 10 is provided with two separate connectors for connecting respectively to the positive and negative terminal engaging elements 11 and 12.

In another embodiment, the connectors are adjacent to each other on the same side of the battery tray 10 and are color coded in the conventional manner with the red connector for connecting to the positive battery terminal engaging element 11 and a black connector for connecting to the negative battery terminal engaging element 12.

In another embodiment, the connectors are on different sides of the tray.

In yet another embodiment, a single connector 34 having a positive and adjacent negative side is used but designed in such a way that the positive side is completely insulated from the negative side.

It is understood that one of skill in the art may design the battery cable bearing means inside the base 20 or on the base 20 of the battery tray and may use one or two separate connectors 34 on any side of the tray 10 without departing from the spirit of the invention.

Figure 4:
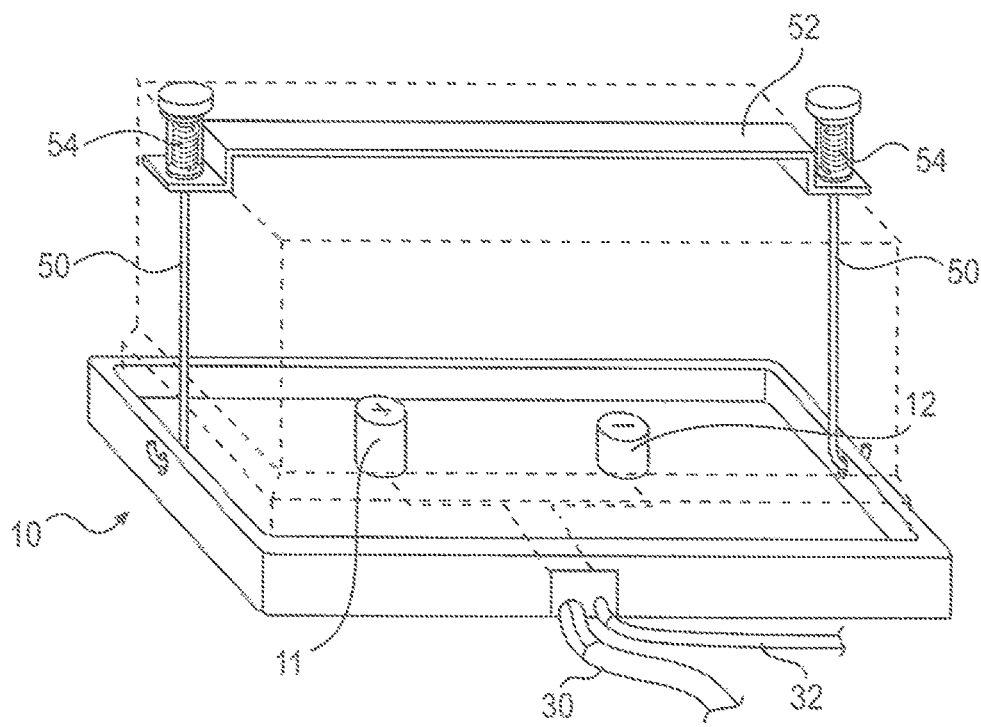
FIG. 4 illustrates one embodiment of a battery hold down assembly configured to operate with the battery and battery tray assembly of FIG. 3.

As shown in FIG. 4, whenever desired, depending on the battery hold down mechanism involved, a series of specially configured slots and apertures may be formed on the walls of the battery tray to receive fastening hooks and bolts that are used to attach battery trays to commercially available automotive vehicles. The invention is not in any way limited to the particular configuration of these slots and apertures.

In marine applications, given the particular hazards caused by the potential for exposure to water, the tray includes end walls and side walls of sufficient height to prevent the splashing of water onto the battery itself. Current regulations require the use of a battery tray which enables the majority of the battery to be exposed to the environment and prohibits the use of encapsulating or encasing receptacles. Furthermore, manufacturers of marine battery trays are required to conform to the criteria set out by Title 33 Code of Federal Regulations Section 183.420.

The electrified battery tray 10 of the present invention may be bottom mounted as shown in FIGS. 1, 2, 3, 4, 5, 6, 7, 8, 21, 22, 23 or side mounted as shown in FIGS. 9, 10, 11, 12, 13, 14, 15, 16, or a modified top mounted electrified battery hood assembly 87 as shown in FIGS. 17, 18, 19, 20.

As shown in FIG. 10, the side mounted configurations come in the form of a modified tray 10 or preferably an electrified battery hood assembly 87 (same configuration) comprising a base 20, a pair of end walls 24, and an extended side wall 22 extending from the base 20 wherein the base and the side walls define a battery receiving interior 26 and the extended side wall 22 extending from the base 20 comprises a pair of battery positive 11 and negative 12 terminal engaging elements wiredly connected to at least one plug receiving connector 34 on the tray 10 or hood assembly 87 for accessing battery power via the at least one connector and wherein the base 20 and/or side wall 22 is provided with a means for carrying the positive 30 and negative 32 cables from the at least one plug receiving connector 34 to the battery terminal engaging elements 11 and 12. Further, a plurality of recessed wells and/or ridges or ribs 73 lie within the interior surface of the battery tray 10 forming a floor upon which the battery 100 is supported. Further still, the battery tray 10 may comprise two separate plug receiving connectors 34 for connecting respectively to the positive 11 and negative 12 terminal engaging elements.

Figure 14:
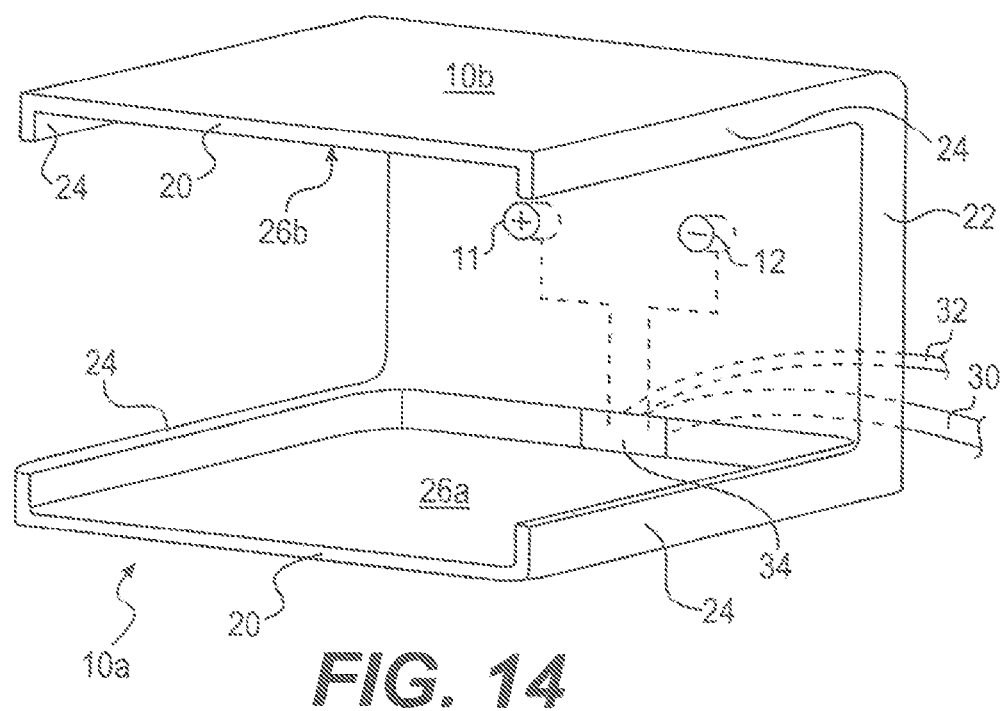
FIG. 14 is a side view of a side mounted battery tray assembly in the form of a three sided hood.
Figure 15:
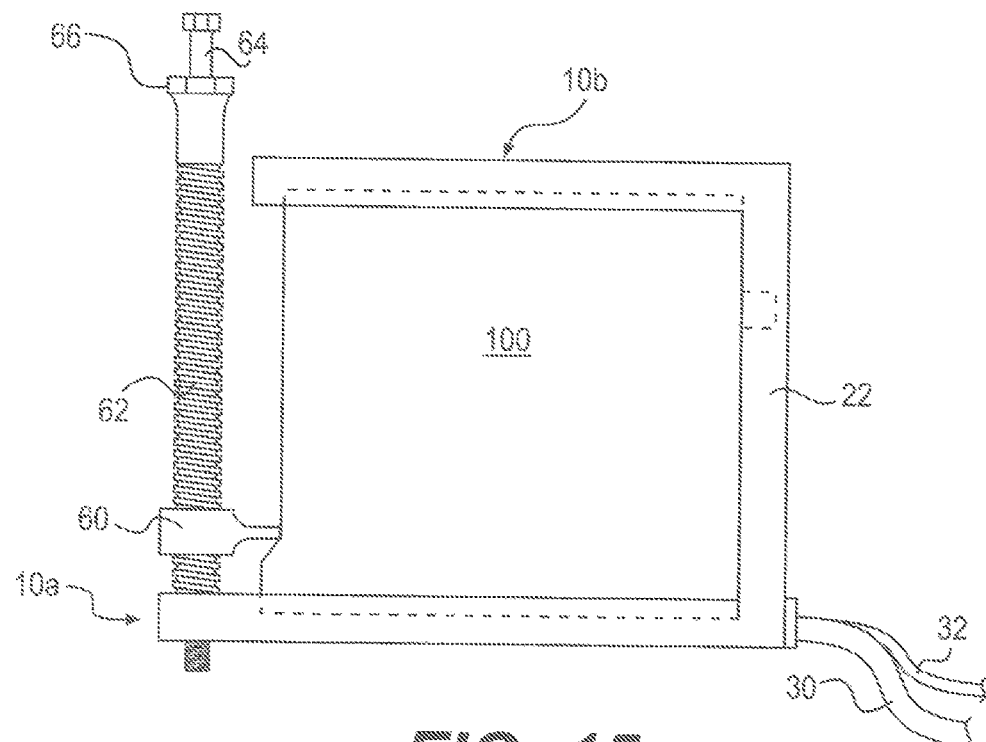
FIG. 15 illustrates the hood and battery assembly of FIG. 14 in conjunction with an easy to use hold down assembly.
Figure 16:
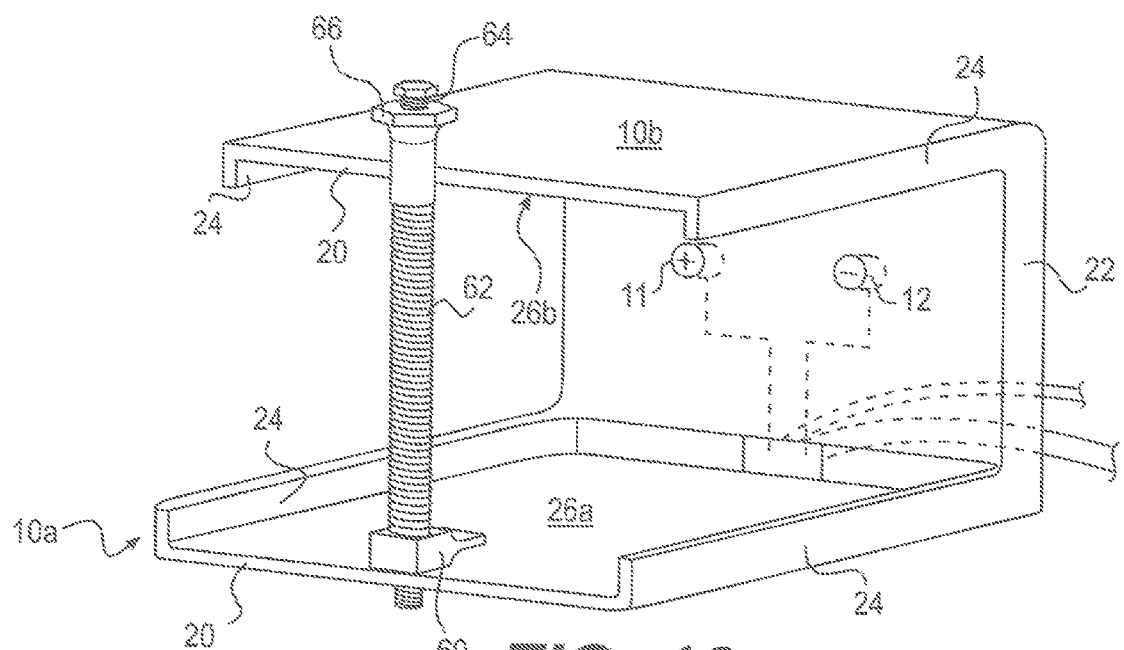
FIG. 16 is a perspective view of the side posted hood and easy to use hold down assembly of FIG. 15.
Figure 17:
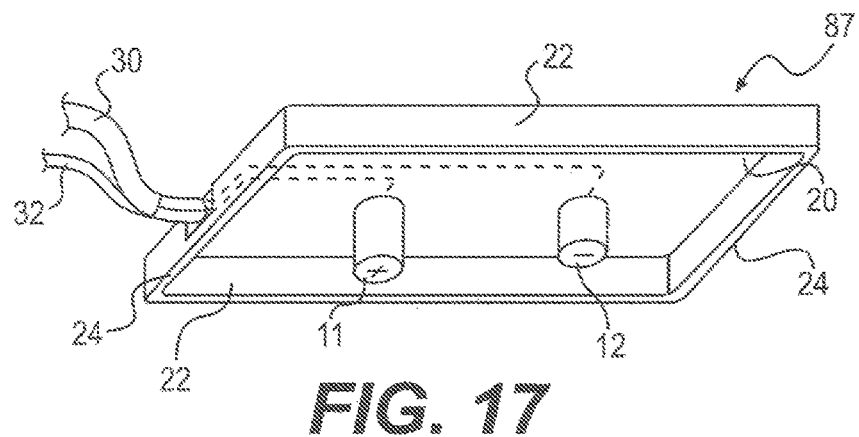
FIG. 17 is a top mounted battery tray having battery terminal engaging elements in the form of cylindrical protrusions.

As shown in FIG. 14, another embodiment of the side mounted tray 10 comprises an electrified battery tray assembly having a top tray 10b and a bottom tray 10a, each tray comprising a base 20, a pair of end walls 24, and an extended side wall 22 connecting the base of the top 10b and bottom tray 10a, wherein the base 20 and end walls 24 of the bottom tray define a battery receiving interior 26a and the base 20 and end walls 24 of the top tray define a battery cradling interior 26b and the extended side wall 22 comprises a pair of battery positive 11 and negative 12 terminal engaging elements wiredly connected to at least one plug receiving connector 34 on the battery tray 10 for accessing battery power via the at least one connector 34.

Figure 18:
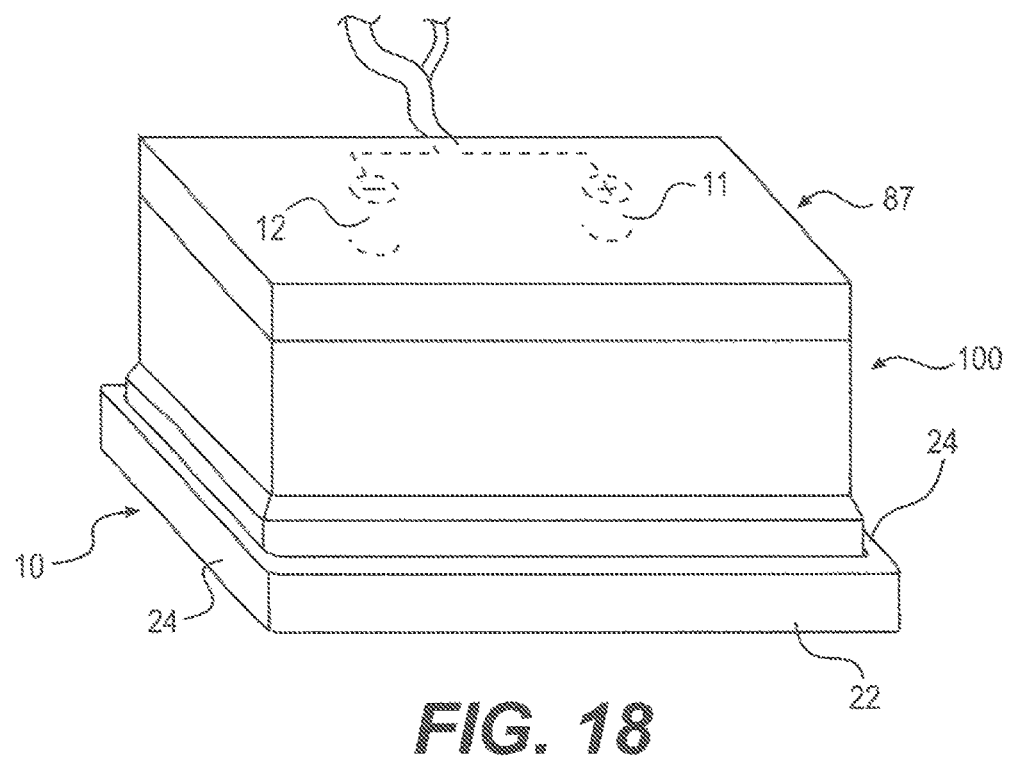
FIG. 18 is an illustration of the top mounted battery tray of FIG. 17 wherein the cylindrical battery terminal engaging elements of the battery tray engages corresponding cylindrical battery terminal cavities on the battery.
Figure 19:
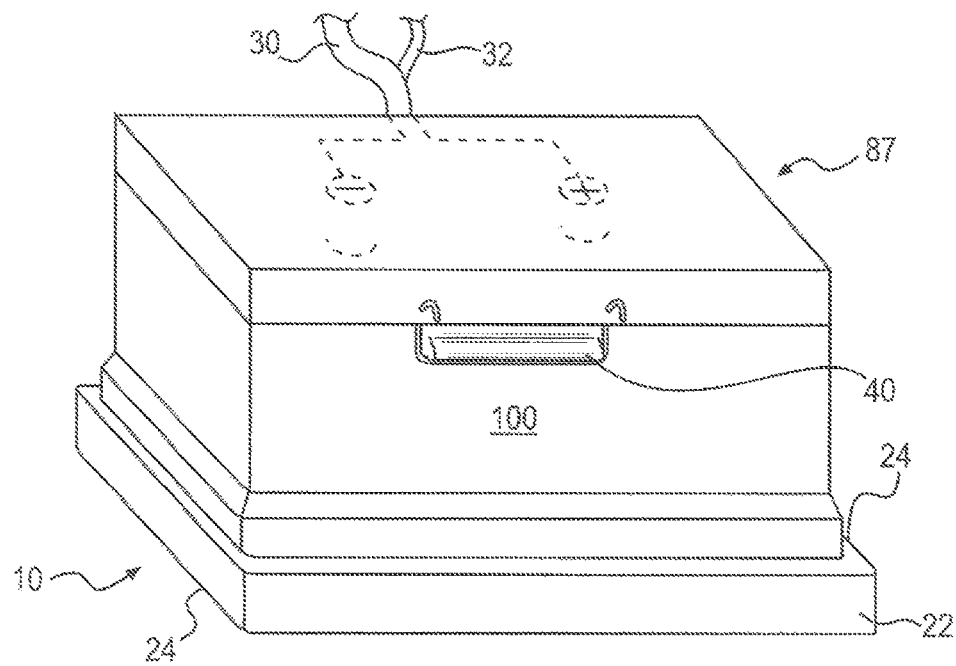
FIG. 19 illustrates the top mounted battery tray of FIG. 18 with a means to further secure the battery tray to the battery.
Figure 20:
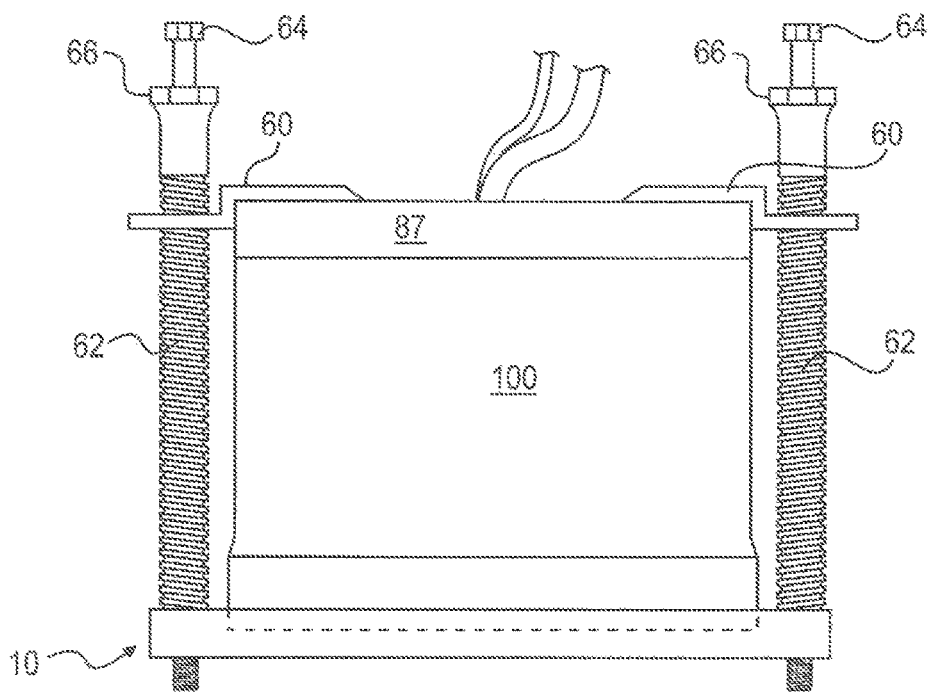
FIG. 20 illustrates an easy to use hold down assembly used in conjunction with one embodiment of the top mounted battery tray.

A top mounted embodiment of the battery tray 10 (i.e. an electrified battery hood 87) of this invention is shown in FIGS. 17, 18, 19 and 20 and includes the same basic configuration of a base 20, a pair of end walls 24 and a pair of side walls 22 and terminal engaging elements 11 and 12 designed to engage the corresponding terminals 101 and 102 of the battery 100. As shown in FIG. 19, one or more retaining clips 40 may be provided on the side 22 and end walls 24 of the battery hood 87 to further retain the battery hood 87 on the battery. Having a top mounted electrified battery hood 87 necessarily warrants the use of a non-electrified tray 10 for carrying the battery as shown in FIGS. 18, 19 and 20.

In one preferred embodiment of the present invention, the battery tray assembly 10 is made of a coupled glass fiber and mica filled polypropylene thermoplastic. This polypropylene thermoplastic material may be filled 40% (37-43%) nominally by weight with a composition of glass and mica having a specific gravity of nominally 1.23 (1.2-1.26). The resulting polypropylene material has excellent stiffness, strength, and dimensional stability.

In one embodiment, the cable carrying means in or on the base 20 of the battery tray 10 can be made of glass fiber filled polypropylene thermoplastic. This polypropylene thermoplastic material may be filled 30% nominally (27-33%) by weight with a glass homopolymer having a specific gravity of 1.12 (1.09-1.15). The resulting injection-moldable, glass fiber-filled polypropylene homopolymer is suitable for mechanical and underhood applications requiring high strength, rigidity, and resistance to temperatures up to 150° C.

Ideally the battery tray assembly is made with materials of such strength and stiffness that it would not tend to expand and contract, i.e., "breathe," as a result of elevated underhood operating temperatures. Battery tray 10 is preferably monolithic, i.e., formed in one piece of a unitary construction of a polymeric material, by any manufacturing method commonly utilized in the art. Any polymeric material having the requisite strength and rigidity to securely support a battery may be used to form battery tray 10 and should meet the requirements detailed in Title 33 Code of Federal Regulations Section 183.420.

The electrified battery tray of this invention is usable with any conventional and unconventional battery hold down mechanisms known in the art. As shown in FIG. 4, the electrified battery tray 10 is usable with a battery hold down assembly for securely clamping and unclamping a battery in a battery tray 10, comprising at least one hold down rod 50, one or more horizontally disposed hold down clamps 52 having one or more openings for passage of the rod 50 there through, and wherein the hold down rod comprises a tensioner 54 for holding down the one or more hold down clamps 52 against the battery 100 and a tensioner retaining means for retaining the tensioner on the hold down rod.

In a preferred embodiment, the tensioner comprises a spring arrangement and the tensioner retaining means comprises a grippable handle. In a most preferred embodiment, the tensioner comprises a compression spring arrangement having a spring, and top and bottom spring seats, and the tensioner retaining means comprises a grippable handle.

In another preferred embodiment, the one or both spring seats further comprise a vibration damper. In another embodiment, the vibration damper comprises a rubber grommet. In yet another preferred embodiment, the compression spring arrangement is encased in a spring capsule. In one embodiment, the grippable handle is integrally molded unto the hold down rod. In another embodiment, the grippable handle is screwedly connected to the hold down rod. In another preferred embodiment, the hold down rod is a j-rod having a curved end for slottable engagement of an opening on the receiving tray or battery compartment of the engine. In yet another preferred embodiment, the battery hold down device comprises two hold down rods for engagement of openings on opposite sides of one hold down clamp. In another embodiment, the hold down clamp comprises a means for extending the length thereof.

The hold down assembly of FIG. 4 provides a tension loaded battery hold down rod adaptable for use in a battery hold down mechanism wherein the hold down rod has a means on one end for engaging an opening on a battery tray and at the other end, comprises a tensioner and a tensioner retaining means for engagement of one or more battery hold down clamps. In one embodiment of the tension loaded battery hold down rod, the tensioner comprises a spring arrangement. In a preferred embodiment, the spring arrangement is a compression spring arrangement comprising a spring and top and bottom spring seats. In another preferred embodiment, the one or both spring seats further comprise a vibration damper. In another embodiment, the vibration damper comprises a rubber grommet. In a most preferred embodiment, the compression spring arrangement is encased in a spring capsule.

The present invention also provides a method for securely clamping and unclamping a battery in an electrified battery tray 10, wherein at least one hold down rod is securely connected to the electrified battery tray 10 on one end and at the other end, is held against one or more horizontally disposed hold down clamps 52 by tension provided by a tensioner operating against a tensioner retaining means at the other end of the hold down rod and the one or more hold down clamps. In a preferred method, the tensioner comprises a spring arrangement and the tensioner retaining means is a grippable handle. In a most preferred method, the spring arrangement comprises a compression spring arrangement having a spring and top and bottom spring seats. In another preferred embodiment, the one or both spring seats further comprise a vibration damper. In another embodiment, the vibration damper comprises a rubber grommet. In one method, the compression spring arrangement is encased in a spring capsule. In another method, the grippable handle is integrally molded unto the hold down rod. In yet another method, the grippable handle is screwedly connected to the hold down rod. In another preferred embodiment, the hold down rod comprises a j-rod having a hooked end for slottable engagement of an opening on the electrified battery tray 10 or battery receiving compartment of the engine. In yet another preferred method, two hold down rods are engaged on opposite sides of one hold down clamp. In another method, the hold down clamp is extendable. In yet another method, the one or more hold down clamps is top mounted.

Figure 13:
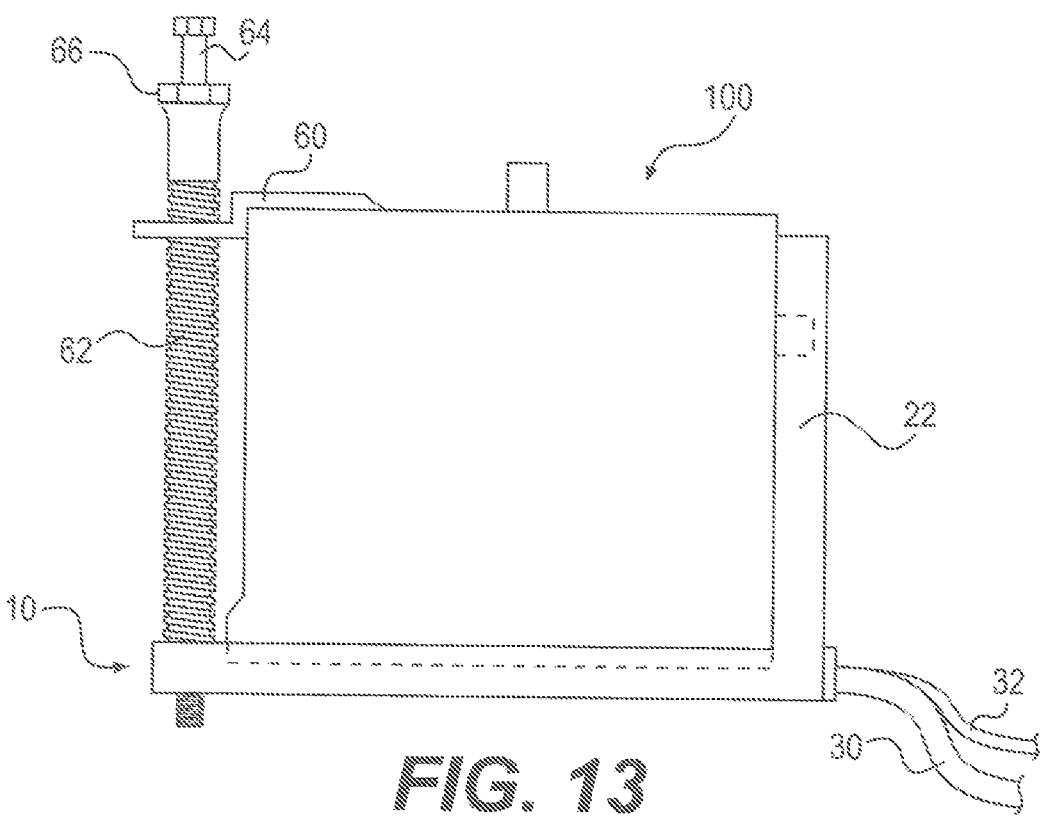
FIG. 13 illustrates a perspective view of the hold down assembly battery tray assembly with a battery received therein.

FIGS. 13 and 20 illustrate an electrified battery tray 10 and a hold down assembly in connection with another embodiment of the invention. The hold down assembly provides a device for securely clamping and unclamping a battery in an electrified battery tray 10, the device comprising an escalatable hold down clamp 60 for clamping either the battery 100 or the tray 10, an escalator means 62 for raising or lowering the clamp in screwed engagement with the escalatable hold down clamp, a hold down rod 64 for fixedly engaging the hold down device unto the battery tray.

In a preferred embodiment, the escalatable hold down clamp is top-mounted. In a most preferred embodiment the escalatable hold down clamp is bottom-mounted. In another embodiment, the escalatable hold down clamp is sized and configured to engage a battery having a bottom flange. In another most preferred embodiment, the escalator comprises a hollow shaft that is screwedly connected to the escalatable hold down clamp. In another preferred embodiment, the hold down rod is a pass through bolt received in the hollow shaft of the escalator. In a preferred embodiment, the escalator further comprises a grippable handle 66. In a most preferred embodiment, the grippable handle is integrally molded with the escalator shaft.

The present invention also provides a method for securely clamping and unclamping a battery in an electrified battery tray 10 using a hold down device comprising one escalatable hold down clamp 60 for clamping the battery 100 or tray 10, an escalator means 62 for raising or lowering the clamp in screwed engagement with the escalatable hold down clamp, a hold down rod 64 for fixedly engaging the hold down device unto the battery tray and wherein the battery is clamped and unclamped by manipulating the escalator means.

In a preferred embodiment, rather than using a tool such as a ratchet, wrench, pliers, etc. during the initial installation of the hold down assembly and each time thereafter, the present invention utilizes escalation as a means for tightening and loosening the hold down clamp onto and away from the battery. A tool may be used to tighten the device to the battery tray during initial installation. To assemble the device a user threads the escalator into the hold down clamp, then passes the hold down rod through the shaft and threads the threaded region into a receiving threaded hole in the battery tray or compartment. Thereafter, whenever a battery change is necessary no tools are required. Rather the grippable handle of the escalator is turned by hand either clockwise or counter-clockwise (depending on whether the threads of the escalator are left- or right-hand threads). Besides the preferred embodiment, requiring simple hand-cranking, other embodiments may achieve escalation of hold down clamp on the escalator by means of pneumatics, hydraulics, pneudraulics, electronics, stepper motor drive circuits, or by some other means. This escalation method allows the entire hold down assembly to stay-in-place permanently after initial installation.

It is understood that other configurations of hold down assemblies can be used with the electrified battery tray 10 without departing from the spirit of the invention.

Likewise, other configurations of electrified battery trays may be used without departing from the spirit of the invention. For instance, the electrified battery tray assembly of the present invention can also be integrally provided with a vacuum reservoir enclosure molded onto the lower part of the battery tray assembly such that the vacuum reservoir enclosure has a common wall with the battery tray.

In accordance with the teachings of U.S. Pat. No. 5,636,701, the present invention can integrate a speed control servo vacuum reservoir into the battery tray structure to form a single battery tray assembly having increased structural integrity over prior battery tray designs providing an air-tight enclosure in which a consistent vacuum reference can be maintained.

Unless otherwise noted, details familiar to persons skilled in the electrical arts such as the size and dimensions of the cable or connectors or how to affix terminal engaging elements unto the electrified battery tray have been omitted since they are extraneous details and thus have no bearing on reducing the invention to practice. Moreover, it is also to be understood, and it will be appreciated by those skilled in the art, that the methodology and logic of the present invention described herein may be carried out using any number of structural configurations such as electronic hardware, software, and/or firmware, or the like and the tray of this invention may be accessorized with sensors and electronics without departing from this invention.

In terms of maximizing battery life, one variable that directly impacts battery life is the thermal conductivity of the tray. Controlling the thermal conductivity of the battery via the battery tray enhances battery life. What is preferred, therefore, is a polymeric battery tray sufficiently strong to carry the battery while maximizing thermal conductivity control.

The battery tray 10 may house a plurality of lead acid batteries or any other type of battery without departing from the scope of the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An electrified battery tray assembly comprising:
a battery tray assembly; and
a battery hold down assembly,
wherein the battery tray assembly comprises:
a base,
a pair of opposing end walls and
a pair of side walls extending from the base defining an interior surface,
the battery tray assembly further comprising
a pair of battery positive and negative terminal engaging elements wiredly connected to at least one plug receiving connector on the battery tray assembly for accessing battery power via the at least one connector; and
wherein the battery hold assembly comprises:
an escalatable hold down clamp having inner threads running from the top to the bottom of said clamp and configured to claim a battery;
an escalator comprising a hollow shaft running from the top to the bottom of the escalator and an outer threaded region,
wherein the outer threaded region is mated with the inner threads of the escalatable hold down clamp;
a hold down rod which passes through the hollow shaft of the escalator and is fixedly engaged to the battery tray assembly allowing the escalator to turn or spin unopposed by the hold down rod;
wherein the escalator is configured to raise and lower the clamp while the battery hold down assembly remains stationary or permanently fixed to the battery tray assembly; and
wherein the turning of the escalator is configured to be achieved by simple hand-cranking, electronics, stepper motor drive circuits, pneumatics, hydraulics, pneudraulics, or a combination thereof.

2. The electrified battery tray of claim 1, wherein
the base has an inner surface and an outer surface, and
the pair of opposing end walls have an outer and inner surface adapted to overlay the base outer surface and to create substantially planar, vertical end wall inner surfaces thereby, and the pair of side walls have outer and inner surfaces adapted to longitudinally overlay the base outer surface and to create substantially planar, vertical left and right side wall inner surfaces thereby and wherein the end and side walls' inner and outer surfaces are spaced to form cavities therebetween and wherein the cavities are filled with a thermal insulation core material.

3. The electrified battery tray of claim 1, wherein the interior surface of the battery tray includes a plurality of ribs lying generally in a single plane, and together define a floor upon which the battery is supported.

4. The electrified battery tray of claim 1, wherein the interior surface on the base of the battery tray comprises the positive battery terminal engaging element and the negative battery terminal engaging element designed to engage a positive battery terminal and a negative battery terminal when the battery is seated on the interior surface of the electrified battery tray.

5. The electrified battery tray of claim 1, wherein the battery terminal engaging elements are configured in the form of cylindrical protrusions from the base.

6. The electrified battery tray of claim 1, wherein the battery terminal engaging elements are configured in the form of J-hook, stab lock, or interlocking receiving cavities designed to engage corresponding J-hook, stab lock, or interlocking terminals on the battery.

7. The electrified battery tray of claim 1, wherein said the at least one plug receiving connector comprises a positive and adjacent negative side configured such that the positive side is completely insulated from the negative side.

8. The electrified battery tray of claim 1, wherein the tray is sized and configured for top mounting, side mounting or bottom mounting.

9. The electrified battery tray of claim 1, wherein the base comprises a means for bearing positive and negative battery cables from the at least one connector to the terminal engaging elements.

10. The electrified battery tray of claim 9, wherein the means for bearing the positive and negative battery cables comprises two separate wire-bearing conduits, well, recess, or channel, one for the positive and the other for the negative cable running up respectively to the positive and negative battery terminal engaging elements.

11. The electrified battery tray of claim 1, wherein the tray comprises two separate connectors for connecting respectively to the positive and negative terminal engaging elements rather than said at least one plug receiving connector.

12. The electrified battery tray of claim 11, wherein the connectors are adjacent to each other on the same side of the battery tray and are color coded in the conventional manner with a red connector for connecting to the positive battery terminal engaging element and a black connector for connecting to the negative battery terminal engaging element.

13. An electrified battery tray assembly comprising a battery tray assembly and a battery hold down assembly
the battery tray assembly comprising
a base,
a pair of end walls, and
an extended side wall extending from the base wherein the base and the end walls define a battery receiving interior, and
wherein the extended side wall extending from the base further comprises a pair of battery positive and negative terminal engaging elements wiredly connected to at least one plug receiving connector on the battery tray assembly for accessing battery power via the at least one connector and wherein the battery hold down assembly comprises
an escalatable hold down clamp having inner threads running from the top to the bottom of said clamp and configured to clamp a battery;
an escalator comprising a hollow shaft running from the top to the bottom of the escalator and an outer threaded region, wherein the outer threaded region is mated with the inner threads of the escalatable hold down clamp;
a hold down rod which passes through the hollow shaft of the escalator and is fixedly engaged to the battery tray assembly allowing the escalator to turn or spin unopposed by the hold down rod;
wherein the escalator is configured to raise and lower the clamp while the battery hold down assembly remains stationary or permanently fixed to the battery tray assembly; and
wherein the turning of the escalator is configured to be achieved by simple hand-cranking, electronics, stepper motor drive circuits, pneumatics, hydraulics, pneudraulics, or a combination thereof.

14. An electrified battery tray assembly comprising:
a battery tray assembly; and
a battery hold down assembly,
wherein the battery tray assembly comprises a top tray and a bottom tray, each tray comprising:
a base,
a pair of end walls, and
an extended side wall connecting the bases of the top and bottom trays,
wherein the base and end walls of the bottom tray defining a battery receiving interior and
the base and the end walls of the top tray define a battery cradling interior, and
wherein the extended side wall further comprises a pair of positive and negative terminal engaging elements wiredly connected to at least one plug receiving connector on the battery tray assembly for accessing battery power via the at least one connector; and
wherein the battery hold down assembly comprises:
an escalatable hold down clamp having inner threads running from the top to the bottom of said clamp and configured to claim a battery;
an escalator comprising a hollow shaft running from the top to the bottom of the escalator and an outer threaded region,
wherein the outer threaded region is mated with the inner threads of the escalatable hold down clamp;
a hold down rod which passes through the hollow shaft of the escalator and is fixedly engaged to the battery tray assembly allowing the escalator to turn or spin unopposed by the hold down rod;
wherein the escalator is configured to raise and lower the clamp while the battery hold down assembly remains stationary or permanently fixed to the battery tray assembly; and
wherein the turning of the escalator is configured to be achieved by simple hand-cranking, electronics, stepper motor drive circuits, pneumatics, hydraulics, pneudraulics, or a combination thereof.

* * * * *